C. ROSSI.
PROCESS OF PRODUCING OXIDS OF NITROGEN AND APPARATUS THEREFOR.
APPLICATION FILED OCT. 22, 1913.
1,266,717.
Patented May 21, 1918.
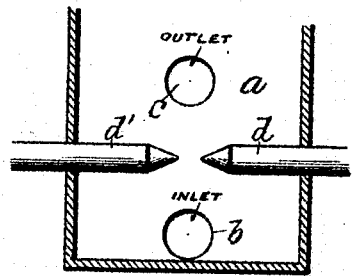
Inventor.
Carlo Rossi,
By
his Attorney.

UNITED STATES PATENT OFFICE.

CARLO ROSSI, OF LEGNANO, ITALY.

PROCESS OF PRODUCING OXIDS OF NITROGEN AND APPARATUS THEREFOR.

1,266,717. Specification of Letters Patent. Patented May 21, 1918.

Application filed October 22, 1913. Serial No. 796,600.

*To all whom it may concern:*

Be it known that I, CARLO ROSSI, chemist, subject of the King of Italy, resident of Legnano, in the Kingdom of Italy, have invented new and useful Improvements in Processes of Producing Oxids of Nitrogen and Apparatus Therefor, of which the following is a specification.

Electric oxidation of nitrogen, whether it be the nitrogen of the atmosphere or nitrogen artificially admixed with oxygen, for the purpose of producing oxids of nitrogen, is usually carried out by means of voltaic arcs struck between appropriate electrodes. The principal object of the present invention is to enhance the efficiency of processes of this general character by preventing decomposition of the nitrogen oxids formed in the arc, and also by promoting combination of nitrogen and oxygen in the process to a higher degree than has heretofore been attainable. In practice, I attain these desirable results by employing electrodes composed of metallic material, having properties especially advantageous for the purposes set forth. This metallic material may be in the form of a metal or an alloy. Any one of a number of metals and alloys hereinafter to be more fully referred to is suitable for the purposes of the present invention, and the invention is to be viewed broadly in this respect.

I have ascertained that many metallic oxids arising from the oxidation of metals of which the electrodes in nitrogen combustion furnaces have heretofore been made, exert a destructive or actively toxic action on the oxids of nitrogen obtained by the action of the voltaic arc. This destructive action is apt to occur especially at that stage of the operation during which the temperature of the hot furnace gases sinks after the gases have left the electric furnace. The period during which the intensely hot furnace gases coming from the arc cool to lower temperatures is an extremely critical stage in the process. At the intermediate temperatures passed over by the gases in the cooling operation, the reversible reactions representing the formation of nitrogen oxids in the arc tend to go backward to a certain extent, and I have discovered that this tendency is furthered by the presence in the hot furnace gases of suspended metallic oxids derived from the electrodes which it has heretofore been the practice to employ in such processes. As a consequence, a part of the oxids of nitrogen produced in the arc are decomposed, and the efficiency of the entire process is thereby materially reduced. The metallic oxids above referred to, which favor the destruction of oxids of nitrogen, probably on account of a catalytic action of some kind, are more particularly the oxids of iron and of the metals of the iron group generally, the oxids of manganese, tin, copper and the like. I have discovered that a very slight quantity of oxid of iron (1 part in 100,000 parts, for example) is sufficient to decompose a substantial proportion of the oxids of nitrogen obtained by the action of the voltaic arc. If, for example, the hot gaseous mixture issuing from the electric furnace contains say 1 per cent. by volume of nitrogen oxids, together with a trace of iron oxid or copper oxid, the mixture after being cooled down contains only from 0.4 to 0.6% nitrogen oxids, the rest of the nitrogen oxids having been decomposed into nitrogen and oxygen through the catalytic action exercised by the iron oxid or the copper oxid.

I have moreover ascertained that the oxids of aluminum and silicon do not exert the destructive action mentioned above, and that these metals are therefore especially adapted to be used in electrodes which are to be employed for the oxidation of atmospheric or other nitrogen.

Furthermore I have discovered that the alloys of aluminum or silicon with a metal of the alkaline type, that is, of the alkaline, alkaline earth, or earth groups, when used as electrodes in the manufacture of nitrogen oxids, give rise to metallic oxids in suspension in the hot furnace gases, which oxids not only do not favor decomposition of nitrogen oxids, but which as a matter of fact exert a catalytic action tending to promote or intensify the combining reaction or reactions between oxygen and nitrogen. Among the metals with which aluminum or silicon may be alloyed for use in electrodes of the character described are: calcium, barium, rubidium, cæsium, lithium, strontium, glucinum, yttrium, lanthanum and cerium. Alloys of aluminum and silicon with thorium are also suitable for the purpose of the invention. In this embodiment of the present process, therefore, the efficiency of the arc is enhanced in consequence of chemical combination between oxygen and nitrogen to an increased extent in the highly heated gases flowing from the electric furnace.

In practice I find it most advantageous to employ electrodes composed of aluminum or of an alloy of aluminum, and particularly of an alloy of aluminum with a relatively small amount of barium.

From the foregoing, it will be seen that the invention herein described may be viewed broadly in two aspects: First, effecting oxidation of nitrogen in a suitable furnace under conditions insuring the absence from the furnace gases of metallic oxids which would tend to destroy or decompose the nitrogen oxids formed; second, carrying out the process under conditions insuring not only the absence of the destructive oxids, but also insuring the presence in the furnace gases of material, specifically a metallic oxid, of the desirable character described, which acts probably catalytically, to promote chemical combination between nitrogen and oxygen and thus to enhance the efficiency of the process.

In the accompanying drawing I have represented diagrammatically an apparatus for carrying out my invention.

In this drawing the furnace is indicated at $a$ and the inlet and outlet of the gas to be treated are shown at $b$ and $c$, respectively, the electrodes of aluminum comprising material being represented at $d\ d'$.

What I claim is:

1. The process of producing oxids of nitrogen which comprises oxidizing nitrogen in a suitable furnace in the presence of electrodes composed substantially entirely of metallic material which by the action of the electric arc develops particles of material having a tendency to prevent decomposition of the nitrogen oxids.

2. The process of producing oxids of nitrogen which comprises subjecting a gaseous mixture comprising nitrogen and oxygen to the action of an electric arc between suitable electrodes composed substantially exclusively of metallic material comprising aluminum.

3. The process of producing oxids of nitrogen which comprises subjecting a gaseous mixture comprising nitrogen and oxygen to the action of an electric arc between electrodes composed of an alloy of aluminum.

4. The process of producing oxids of nitrogen which comprises subjecting a gaseous mixture comprising nitrogen and oxygen to the action of an electric arc between electrodes composed of an alloy of aluminum with a metal of the alkaline type.

5. The process of producing oxids of nitrogen which comprises subjecting a gaseous mixture comprising nitrogen and oxygen to the action of an electric arc between electrodes composed of an alloy of aluminum with an alkaline earth metal.

6. The process of producing oxids of nitrogen which comprises subjecting a gaseous mixture comprising nitrogen and oxygen to the action of an electric arc between electrodes composed of an alloy of aluminum with barium.

7. Apparatus for producing oxids of nitrogen comprising the combination, with a suitable furnace structure, of electrodes composed substantially entirely of metallic material comprising aluminum.

8. Apparatus for producing oxids of nitrogen comprising the combination, with a suitable furnace structure, of electrodes composed of an alloy of aluminum.

9. Apparatus for producing oxids of nitrogen comprising the combination, with a suitable furnace structure, of electrodes composed of an alloy of aluminum with a metal of the alkaline type.

10. Apparatus for producing oxids of nitrogen comprising the combination, with a suitable furnace structure, of electrodes composed of an alloy of aluminum with an alkaline earth metal.

11. Apparatus for producing oxids of nitrogen comprising the combination, with a suitable furnace structure, of electrodes composed of an alloy of aluminum with barium.

12. Apparatus for producing nitroger oxids, comprising the combination, with a suitable furnace structure, of electrodes composed of material comprising a metal whose oxid can exist at furnace temperatures and is without destructive action on nitrogen oxids at or below furnace temperatures, the electrodes being free of any metal whose oxid tends to decompose nitrogen oxids.

In testimony whereof I hereunto affix my signature in the presence of two witnesses.

CARLO ROSSI.

Witnesses:
 ENRICO VERONELLI,
 MAYRI EARLO TESTE.